Aug. 6, 1935.  R. C. EVANS  2,010,539
HOSE REEL ASSEMBLY
Filed Dec. 4, 1933  3 Sheets-Sheet 1

Inventor
Ronald Clement Evans.
by Charles Orshiels Attys.

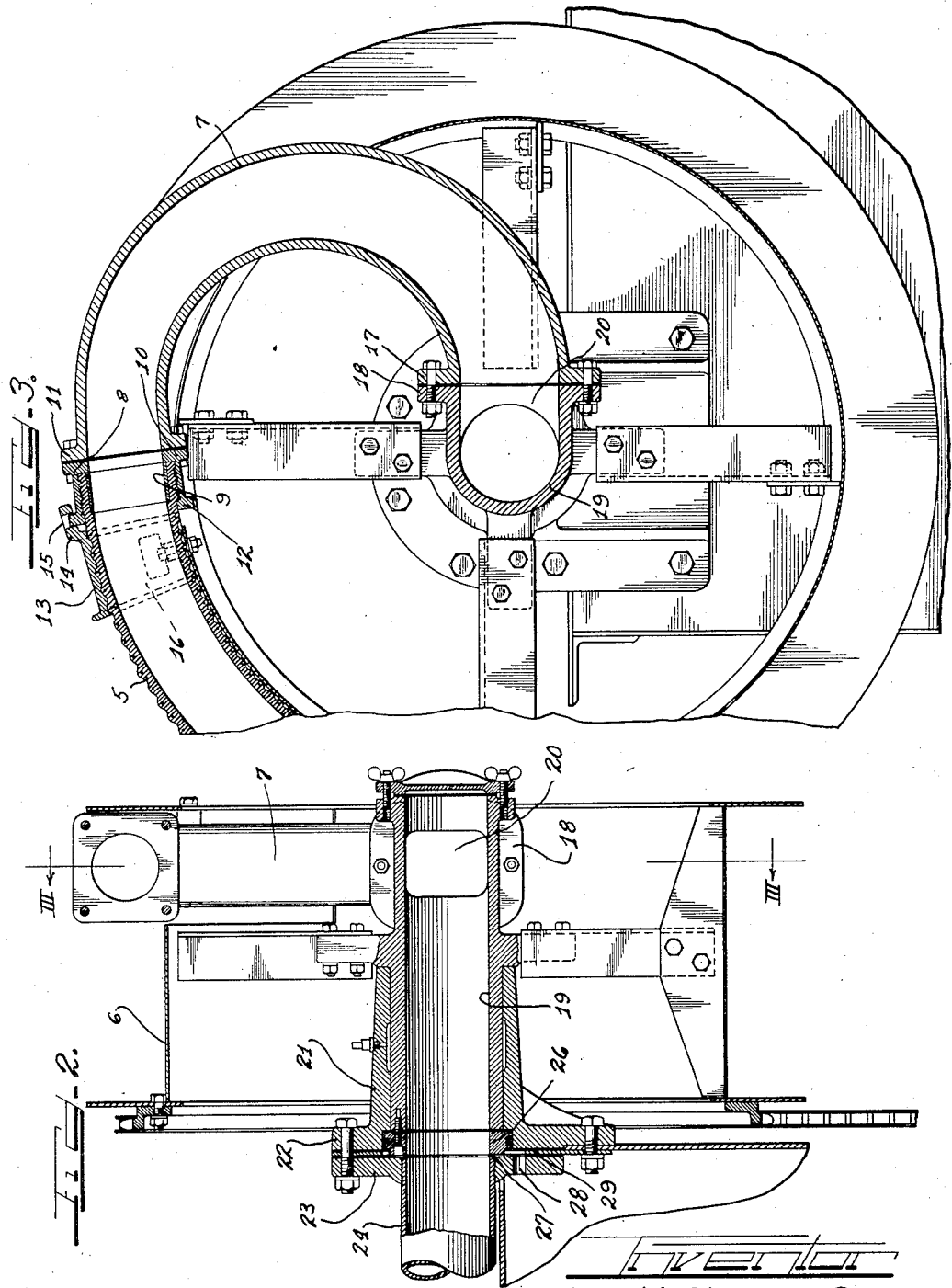

Aug. 6, 1935.  R. C. EVANS  2,010,539
HOSE REEL ASSEMBLY
Filed Dec. 4, 1933   3 Sheets-Sheet 3
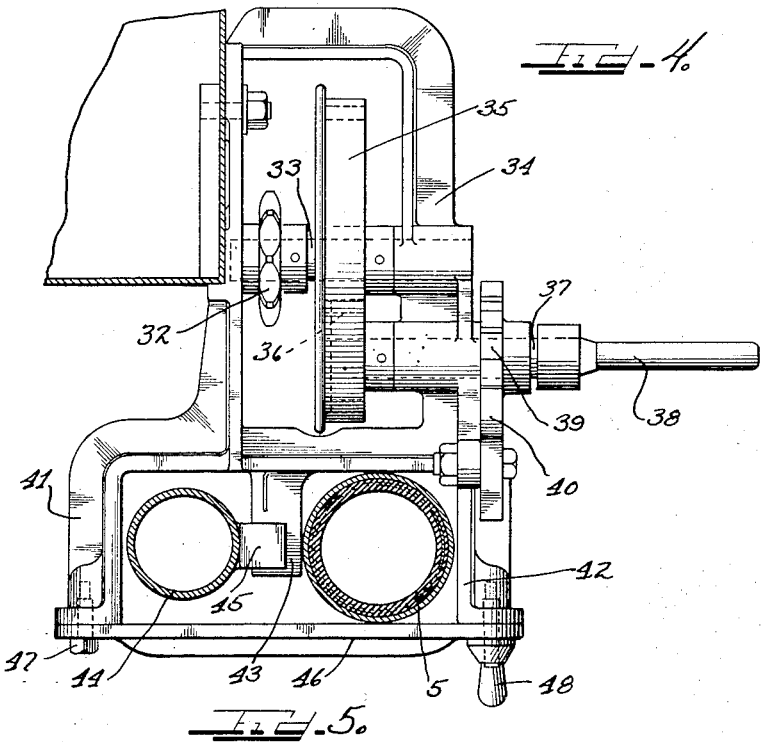
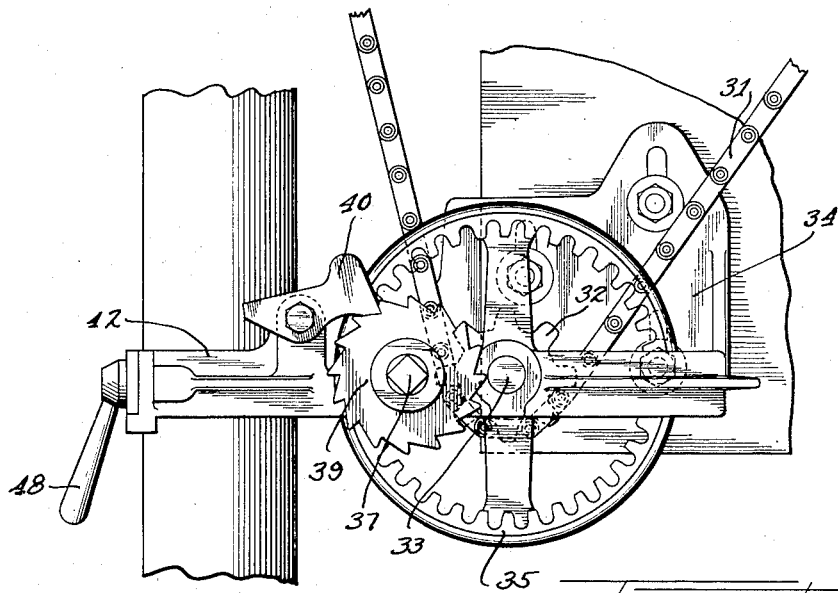
Inventor
Ronald Clement Evans.
by Charles H. Wills Attys.

Patented Aug. 6, 1935

2,010,539

UNITED STATES PATENT OFFICE 2,010,539

HOSE REEL ASSEMBLY

Ronald Clement Evans, Elgin, Ill., assignor to Municipal Appliance Company, New York, N. Y., a corporation of Maine Application December 4, 1933, Serial No. 700,932

7 Claims. (Cl. 37—61)

This invention relates to a hose reel assembly for apparatus for cleaning out catch basins, cess pools, grit chambers, and the like whereby it is possible to elevate the hydraulic elevator used in such machines and support the same in elevated position properly connected for use as soon as lowered in a catch basin.

It is an object of this invention to provide a novel hose reel wherein an end of the hose on the reel is secured to and in communication with the interior of the reel.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 2 is an enlarged longitudinal sectional view thru the reel.

Figure 3 is an enlarged transverse sectional view thru the reel.

Figure 4 is an enlarged plan view of the reel keeper showing the hydraulic elevator in section.

Figure 5 is an enlarged fragmentary elevational view of the hoisting mechanism for the hydraulic elevator.

Figure 1:
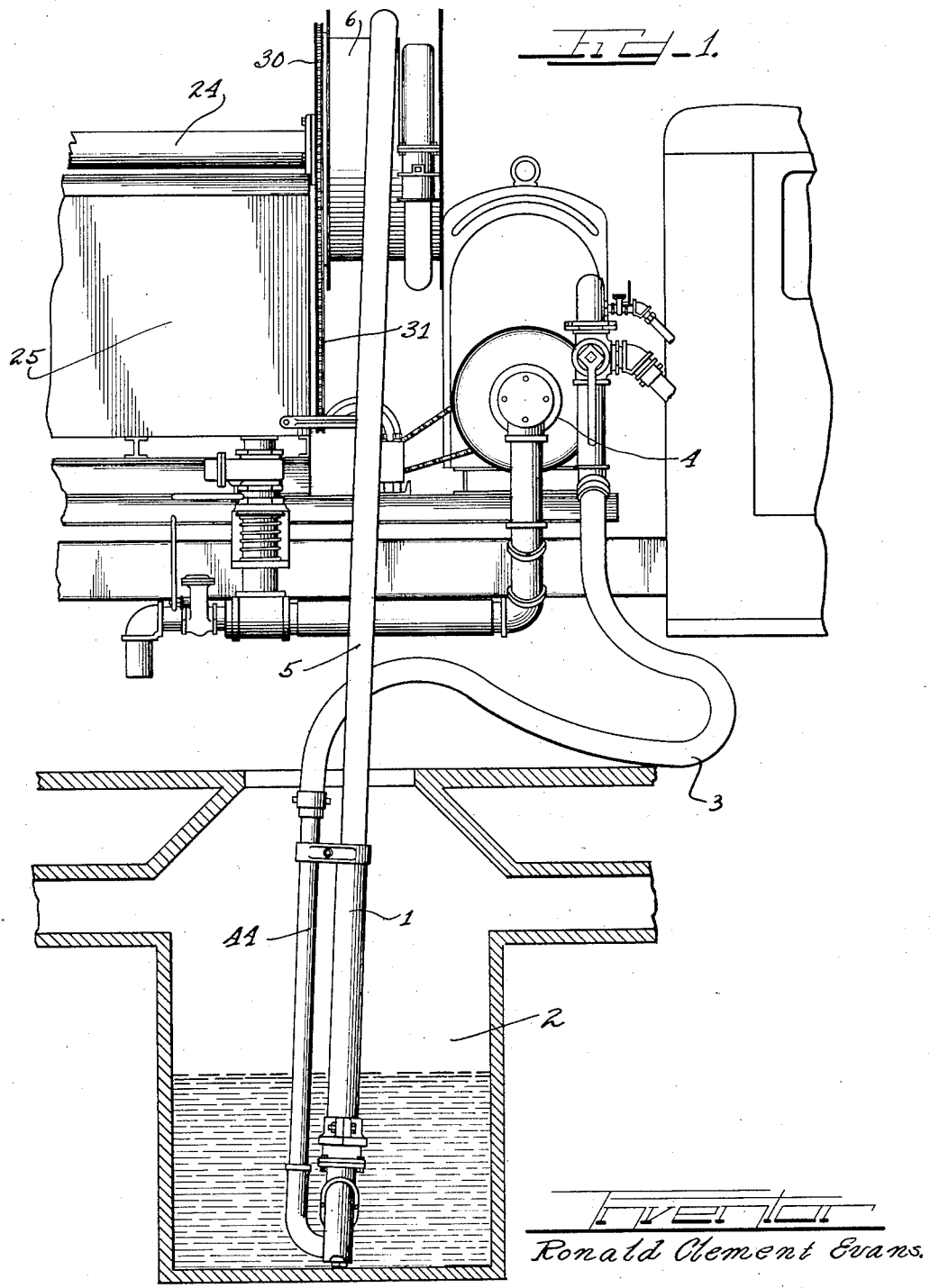
Figure 1 is an enlarged fragmentary elevational view of the reel assembly involving this invention.

In referring to Figure 1 it will be observed that there is illustrated a part of a machine for cleaning out catch basins. The hydraulic elevator 1 is shown in a catch basin 2. The pressure line 3 of the elevator is connected to a pump 4, while the discharge line 5 is wound around a reel 6 and the upper end thereof is connected to a curved pipe section 7 extending thru the reel as will now be set forth.

It will be noted in Figure 3 that the discharge hose is suitably armored and that the upper end thereof is unarmored and extends into a sleeve 8 which is serrated upon its inner surface. An expander ring 9 within the hose expands the same against the serrations in the sleeve. The sleeve 8 has a flange 10 that is bolted to a flange 11 on the pipe section 7. The remote end of the sleeve 8 has a rib 12. A clamp 13 extends over the hose 5 adjacent the sleeve 8 and has an upwardly offset portion 14 provided with a slot 15 into which the rib 12 extends. The clamp 13 has downwardly extending portions 16 shown in dotted lines in Fig. 3 that are bolted or secured to the reel. This feature of construction greatly reduces the strain upon the base at its connection with the pipe section 7.

The lower end of the curved arm 7 is provided with a flange 17 that is bolted to a flange 18 formed upon the hollow reel shaft 19 around an inlet port 20. The outer end of the hollow shaft 19 has bolted thereto a removable closure cap 19ª which is adapted to be removed to afford access to the interior of this shaft and the tubular arm 7. The hollow reel shaft 19 is journalled in a stationary sleeve bearing 21 having a flange 22 upon its rear end to which a flange 23 is secured. The flange 23 is provided with an aperture substantially in registry with the axial bore in the reel shaft. A sediment discharge pipe 24 that empties into a settling tank 25 extends into the aperture in the flange 23. The tank may be of any suitable form.

The sediment which is usually saturated with water passes from the hose 5 thru the pipe section 7 and thru the hollow reel shaft 19 to the pipe 24 which discharges into the tank as above set forth. There is a tendency for sediment to creep between the flange 23 and the adjacent end of the hollow reel shaft 19. Means have been provided for washing away any sediment that may thuswise creep in. To this end, there is provided between the packing 26 that is attached to the end of the reel shaft 19 and the flange 23, a passage 27 for water seepage and an outlet port 28 therefor in the flange 23. The passage 27 is preferably formed by cutting away a portion of a packing 29 between the flange 23 and the flange 24.

Means are provided for rotating the reel for elevating the hydraulic elevator from the catch basin. It will be observed that a sprocket wheel 30 is attached to one end of the reel 6 and that a sprocket chain 31 is trained over said sprocket wheel. This sprocket chain 31 is also trained over a sprocket wheel 32 (Figs. 4 and 5) secured upon a shaft 33 journalled in a suitable casting 34. An internal gear 35 is secured upon the shaft 33. A pinion 36 shown in dotted lines in Fig. 4 meshes with said internal gear. This pinion is secured upon a shaft 37 journalled in the casting and provided with a crank handle 38 at one end.

A ratchet wheel 39 is secured upon the shaft 37 and a pawl 40 pivoted upon the casting engages said ratchet wheel to prevent reverse rotation of the shaft 37 and the reel 6. By rotating the hand crank 38, the reel 6 will be rotated for elevating the hydraulic elevator, and when the hand crank is released the pawl 40 due to its engagement with the ratchet wheel will prevent any reverse rotation of the reel due to the downward pull of the hydraulic elevator. When it is desired to lower the hydraulic elevator, the pawl 40 is disengaged from the ratchet wheel.

The hydraulic elevator is adapted to be supported and confined in a keeper in its elevated position as will presently appear. With reference to Fig. 4, it will be observed that a pair of arms 41 and 42 extend horizontally from the casting 34. The casting 34 is provided with a lug 43 extending between said arms. The aforementioned pressure hose 3 is connected to a metal pipe 44 that is adapted to extend into the catch basin and this metal pipe is provided with a lug 45 adapted for resting upon the top of the lug 43.

The space or recess between the arms 41 and 42 is adapted to be closed by a swinging bar 46 which is pivoted to the end of the arm 41 by a pivot pin 47. The swinging bar 46 is secured to the end of the arm 42 by a removable pin 48. When the pin 48 is removed, the bar 46 may be swung to the left to allow the hydraulic elevator to be manually shifted into or from the recess between the arms.

When the hydraulic elevator is in the catch basin and it is desired to elevate the same, the hand crank 38 is operated until the hydraulic elevator is raised sufficiently to bring the lug 45 above the support 43, the bar 46 may then be released and swung out of the way when the hydraulic elevator may be shifted into the recess between the arms 41 and 42 to bring the lug 45 over the support 43. If necessary, the hydraulic elevator may then be lowered to bring the lug 45 into supporting engagement with the support 43. The confining bar 46 may then be swung back and attached to the arm 42.

From the foregoing, it will be apparent that a novel form of reel assembly has been provided for a catch basin cleaning apparatus, that provides for an axial discharge thru the reel and permits the hydraulic elevator to be raised and supported upon the machine when not in use.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an apparatus of the class described, a reel, a hydraulic elevator having a hose wound upon said reel, means for rotating said reel for raising said hose and elevator, means independent of said reel for supporting said elevator in its raised position, said hose having a projection and said supporting means being effective upon a lateral movement of a portion of the hose bringing such projection into engagement with said supporting means and means for confining the same elevator against lateral movement in such vertical position, said hydraulic elevator being supported by the reel when in use so that its position in the catch basin may be controlled by the rotation of the reel.

2. In an apparatus of the class described, a pipe, a rotatable reel having a hollow shaft arranged coaxially with said pipe, a connection between said shaft and pipe, a hydraulic elevator for discharging fluid containing solid matter thru said hollow shaft and pipe, and means for causing seepage of fluid in the connection between said hollow shaft and pipe to wash the connection free of particles of sediment deposited therein from the discharged fluid.

3. In an apparatus of the class described, a reel having a hollow shaft, a tube connected to said hollow shaft and comprising a part of said reel, a hydraulic elevator having an armoured hose wound upon said reel, a connection between an end of said hose and said tube including a clamping member engaging the armor over said hose and having a rigid connection with said tube so that the strain incident to the weight of the hose is transmitted through the hose armor to the reel.

4. In an apparatus of the class described, a tube, a sleeve connected to the end of said tube, an armored hose for conducting fluid under pressure and extending into said sleeve, means within the hose for expanding the same against said sleeve, and a clamping member engaging the armor on said hose and said sleeve for absorbing the strain upon said hose.

5. In a hydraulic apparatus for cleaning catch basins or the like, a rotatable hose reel including a hollow axial shaft, an arcuate tube extending transversely outwardly directly from said shaft and having its inner end connected to the interior of said shaft, and a hose connected to the outer end of said tube and adapted to be wound on said reel, said arcuate tube being curved throughout its length thereby establishing a smooth unbroken curved fluid path between the hose and the interior of said hollow shaft.

6. In a hydraulic apparatus for cleaning catch basins or the like, a rotatable hose reel including a hollow axial shaft, an arcuate tube extending transversely outwardly from said shaft and having its inner end connected to the interior of said shaft, a hose connected to the outer end of said tube and adapted to be wound on said reel, said arcuate tube establishing a smooth unbroken curved fluid path between the hose and the interior of said hollow shaft, a fluid connection in communication with an end of said shaft, and means connecting said end of the shaft to said conduit, including a bearing for said shaft and packing means between the shaft and the conduit including a bypass around said packing means for enabling fluid to seep through the connection for washing away grit and solid particles deposited in the packing means.

7. In a hydraulic apparatus for cleaning catch basins or the like, a rotatable hose reel including a hollow axial shaft, an arcuate tube extending transversely outwardly directly from said shaft and having its inner end connected to the interior of said shaft, and a hose connected to the outer end of said tube and adapted to be wound on said reel, said arcuate tube being curved throughout its length thereby establishing a smooth unbroken curved fluid path between the hose and the interior of said hollow shaft, said hollow shaft having a normally capped opening adjacent the inner end of said arcuate tube and through which opening access may be had to the interior of said shaft and tube.

RONALD CLEMENT EVANS.